United States Patent [19]

Taylor

[11] Patent Number: 5,614,613
[45] Date of Patent: Mar. 25, 1997

[54] MONOAZO REACTIVE DYES

[75] Inventor: John A. Taylor, Prestwich, United Kingdom

[73] Assignee: Zeneca Limited, London, England

[21] Appl. No.: 205,113

[22] Filed: Mar. 3, 1994

[30] Foreign Application Priority Data

Mar. 29, 1993 [GB] United Kingdom .................. 9306452

[51] Int. Cl.⁶ .................. C09B 62/51; C09B 62/085; D06P 1/38
[52] U.S. Cl. .................. 534/638; 534/605; 534/612; 534/632; 534/642
[58] Field of Search .................. 534/605, 612, 534/632, 638, 642

[56] References Cited

U.S. PATENT DOCUMENTS

| | | | |
|---|---|---|---|
| 2,892,828 | 6/1959 | Stephen | 534/638 X |
| 2,892,829 | 6/1959 | Stephen | 534/638 X |
| 2,979,498 | 4/1961 | Andrew et al. | 534/638 X |
| 3,351,578 | 11/1967 | Andrew et al. | 534/632 |
| 4,080,322 | 3/1978 | Mislin et al. | 534/732 |
| 4,145,340 | 5/1979 | Ridyard | 534/638 X |
| 4,474,697 | 10/1984 | Wunderlich et al. | 534/638 |
| 4,518,391 | 5/1985 | Auerbach | 534/638 X |
| 4,808,706 | 2/1989 | Seiler | 534/638 |
| 5,003,053 | 3/1991 | Springer et al. | 534/638 |

FOREIGN PATENT DOCUMENTS

| | | | |
|---|---|---|---|
| 1062367 | 7/1959 | Germany . | |
| 1076853 | 3/1960 | Germany . | |
| 2729240 | 1/1979 | Germany . | |
| 2731617 | 2/1979 | Germany . | |
| 78485 | 6/1979 | Luxembourg . | |
| 716007 | 9/1954 | United Kingdom . | |
| 899376 | 6/1962 | United Kingdom . | |
| 946998 | 1/1964 | United Kingdom | 534/605 |
| 982479 | 2/1965 | United Kingdom | 534/605 |
| 1037981 | 8/1966 | United Kingdom . | |

OTHER PUBLICATIONS

Courtin et al: On the synthesis of sulfonated Derivatives of 2,3-Dimethylanilline and 3,4-Dimethylanilline Helvetica Chimica Acts—vol. 63, Fasc.2 (1980)—Nr. 37. pp. 385–394.

*Primary Examiner*—Fiona T. Powers
*Attorney, Agent, or Firm*—Cushman Darby & Cushman IP Group Pillsbury Madison & Sutro LLP

[57] ABSTRACT

A compound of the Formula (1) and salts thereof:

$$R^1 \text{—} \underset{R^2}{\overset{(SO_3H)_m}{\bigcirc}} \text{—} N=N \underset{HO_3S}{\overset{OH}{\bigcirc\bigcirc}} \underset{(SO_3H)_N}{\overset{R^3}{\text{—}N}} \underset{N}{\overset{X(1)}{\underset{Y}{\bigcirc}}}$$

wherein:
$R^1$ and $R^2$ are each independently optionally substituted alkyl;
$R^3$ is H or optionally substituted alkyl;
X is a labile atom or group;
Y is a labile atom or group or a group of formula $$-\underset{R^5}{\overset{-N-R^4}{|}}$$

or $-OR^5$;
$R^4$ is H or alkyl;
$R^5$ is H or optionally substituted alkyl or aryl; and
m and n each independently have a value of 0 or 1.

The compounds are useful for the coloration of textile materials.

9 Claims, No Drawings

MONOAZO REACTIVE DYES

This invention relates to organic compounds suitable for use as reactive dyes and to their preparation and use.

According to the present invention there is provided a compound of the Formula (1) and salts thereof:

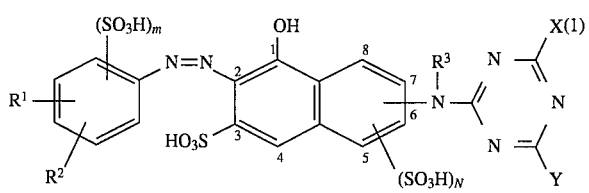

wherein:
- $R^1$ and $R^2$ are each independently optionally substituted alkyl;
- $R^3$ is H or optionally substituted alkyl;
- X is a labile atom or group;
- Y is a labile atom or group or a group of formula

or $-OR^5$;
- $R^4$ is H or alkyl;
- $R^5$ is H or optionally substituted alkyl or aryl; and
- m and n each independently have a value of 0 or 1.

When any of $R^1$, $R^2$, $R^3$, $R^4$ and $R^5$ is alkyl it is preferably $C_{1-4}$-alkyl, more preferably methyl or ethyl. $R^3$ is preferably H. $R^4$ is preferably H, methyl or ethyl. $R^1$ and $R^2$ are preferably methyl.

Preferably $R^1$ is para- with respect to the azo group and $R^2$ is meta- with respect to the azo group.

When $R^5$ is optionally substituted aryl it is preferably optionally substituted phenyl, more preferably phenyl which is unsubstituted or has from 1 to 3 substituents.

When R, $R^1$, $R^2$, $R^3$, $R^4$ or $R^5$ is substituted it is preferred that each substituent is selected from amino, sulpho, carboxy, methyl, hydroxy, nitro and halo.

When X and Y are both a labile atom or group the compounds of Formula (1) may be used as reactive dyes per se or as intermediates en route to the preferred compounds of Formula (1) wherein Y is of Formula $-NR^4R^5$. When both X and Y are labile it is preferred for synthetic convenience that they are identical to one another.

m preferably has a value of 1.

The group $-NR^3-$ in Formula (1) is preferably at the 6- or 8- position indicated on the naphthalene ring, more preferably at the 8- position.

By labile atom or group it is meant an atom or group attached directly to the triazine ring which is displaceable by a nucleophile under alkaline conditions. The preferred labile atom is a halogen, especially F or Cl. The preferred labile group is sulpho, more preferably a quaternary ammonium group. As examples of quaternary ammonium groups there may be mentioned trialkyl ammonium groups and optionally substituted pyridinium groups, especially 3-carboxypyridinium and 4-carboxypyridinium.

The compounds of the present invention are preferably in the form of a salt with an alkali metal or mixture thereof or as an ammonium salt. Conveniently the compounds are in the form of a sodium, potassium or lithium salt or mixture thereof.

A preferred class of compound according to the invention is of Formula (2) or a salt thereof:

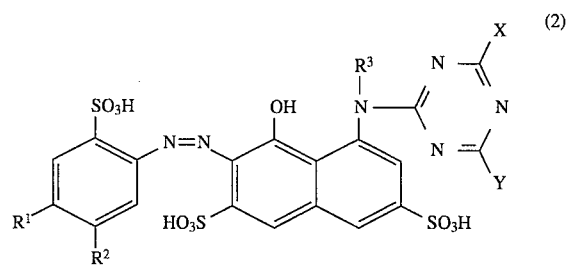

wherein: $R^1$, $R^2$, $R^3$, X and Y are as hereinbefore defined.

The compounds of Formula (2) have an attractive bluish-red shade which is particularly bright.

Compounds of Formula (1) may be prepared by a process comprising condensation of compounds of Formula (3) and (4), preferably in the presence of an acid binding agent:

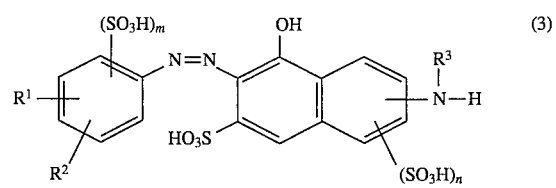

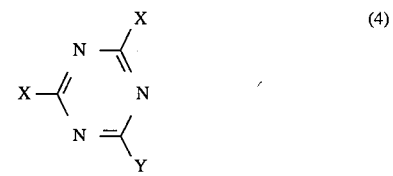

In Formulae (3) and (4) $R^1$, $R^2$, m, n, $R^3$, X and Y are as hereinbefore defined.

When a compound of Formula (1) is required wherein Y is $-NR^4R^5$ one may condense a dihalotriazine compound of Formula (1) wherein X and Y are halogen atoms, preferably F or Cl, with an amine of formula $H-NR^4R^5$ ($R^4$ and $R^5$ as defined above). For the preparation of compounds of Formula (1) wherein Y is $-OR^5$ it is preferred that a compound of Formula (3) is condensed with a compound of Formula (4) wherein Y is $-OR^5$ and $R^1$, $R^2$, m, n, $R^3$ and X are as hereinbefore defined. The condensations are preferably performed in the presence of an acid binding agent, for example sodium or potassium, hydroxide, carbonate or bicarbonate. A pH of 6–9 may be used. A temperature of 5° to 50° C. usually suffices.

The aforementioned condensations are preferably performed in aqueous solvent, especially water.

Compounds of Formula (3) may be prepared by diazotisation of an aniline compound bearing the required substituents, preferably using $NaNO_2$ below 5° C. in dilute mineral acid, and coupling the diazotised aniline to a suitable 1-hydroxy-3-sulphonaphthalene compound, for example H-Acid.

A particularly useful compound of Formula (3) is of the Formula (5) or salt thereof:

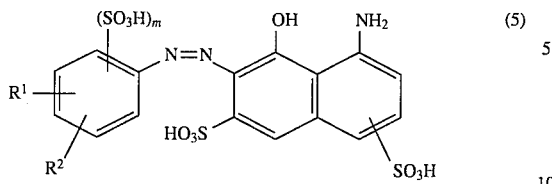

wherein:

$R^1$, $R^2$ and m are as hereinbefore defined.

Preferred compounds of Formula (5) are where m is 1 and the —$SO_3H$ group is at the 2- position (relative to the —N=N— group), $R^1$ is at the 4- position and $R^2$ is at the 5- position.

A further feature of the present invention provides a composition comprising an inert carrier and a compound of Formula (1), preferably in a weight ratio of 1:99 to 99:1, more preferably 50:1 to 1:50, especially 20:1 to 1:20. The inert carrier preferably comprises inorganic salts and optionally a de-dusting agent. Examples of inorganic salts include alkali and alkaline earth metal halides, carbonates, bicarbonates, nitrates and mixtures thereof. Dodecylbenzene may be used as de-dusting agent.

The compounds of Formula (1) are suitable for coloring natural and artificial textile materials containing amino or hydroxyl groups, for example textile materials such as wool, silk and cellulosic materials. The textile materials are colored bright shades and possess good fastness to light and to wet treatments such as washing and also have good wash-off properties. Particularly good results were found when the compounds were applied to cotton or viscose, especially by printing. The dyes are found to have good solubility in water allowing the preparation of high strength, environmentally friendly liquid formulations. When formulated as a print paste the dyes showed good storage stability.

A further feature of the invention comprises a process for the coloration of a textile material, especially a cellulosic textile material, by applying thereto a compound of Formula (1). For this purpose the compound is preferably applied to the cellulosic textile material in conjunction with a treatment with an acid-binding agent, for example, sodium bicarbonate, sodium carbonate, sodium metasilicate, trisodium phosphate or sodium hydroxide, which may be applied to the cellulose textile material before, during or after the application of the compound. The preferred process for coloration is a printing process.

The compounds of Formula (1) can be applied to textile materials containing amino groups, such as wool and polyamide textile materials, from a mildly alkaline, neutral or acid dyebath. The dyebath may contain substances which are commonly used in the dyeing of textile materials containing amino groups, for example ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

According to a further aspect of the present invention there is provided a textile material colored by a dye or by a coloration process as hereinbefore described.

The invention is illustrated but not limited by the following Examples in which all parts and percentages are by weight unless stated otherwise.

EXAMPLE 1

Preparation of a dye of the formula

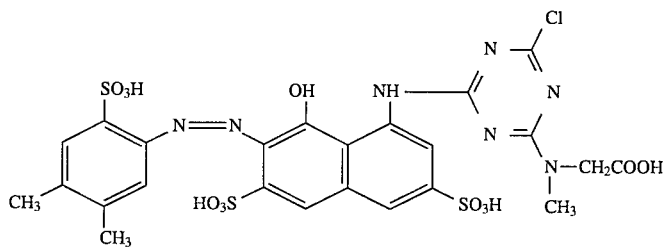

Stage a)

A solution of sodium hydroxide was added to 2-amino-4,5-dimethylbenzenesulphonic acid (0.42M) in water (500 ml) to pH 8.0. 2N sodium nitrite (210 ml, 0.42M) was added slowly, with stirring, to a mixture of concentrated hydrochloric acid and ice/water (180 ml). After stirring for 2 hours at 0°–5° C. and pH <2 excess nitrous acid was destroyed by adding a small amount of sulphamic acid to give a suspension of 2-sulpho-4,5-dimethylbenzenediazonium chloride.

Stage b)

The product of Stage a) was added slowly to a cold stirred solution of 1-hydroxy-8-acetylaminonaphthalene-3,6-disulphonic acid (M.I. 537.3,252.5 g, 0.47M) keeping the pH at 5–6 by the addition of sodium hydroxide solution. After the addition was complete the mixture was stirred at below 5° C. and pH 6 to 6.5 for 2 hours. Sodium hydroxide solution (760 g) was added and the mixture stirred at 60°–70° C. for 6 hours. The mixture was allowed to cool to 20°, concentrated hydrochloric acid was added to pH 6 followed by salt solution (3% w/v). The resultant 1-hydroxy-2-(2-sulpho-4, 5-dimethylphenylazo)-8-amino naphthalenedisulphonic acid (250 g) and was collected and dried.

Stage c)—dichlorotriazine dye

A solution of cyanuric chloride (8.12 g, 0.044M) in acetone (70 ml) was added to a stirred mixture of ice and water (300 g) containing a few drops of Calsolene oil. A solution of the product from Stage b) (30.45 g, 0.04M) in water/ice was added slowly to the aqueous suspension of cyanuric chloride keeping the temperature at 0°–5° C. and the pH 6 to 6.5 by the addition of 2N sodium carbonate solution. After 2 hours reaction was complete, as judged by hplc, and a small amount of insoluble material was filtered off leaving a solution of 1-hydroxy-2-(2-sulpho-4,5-dimethylphenyl)-8-(4,6-dichloro-s-triazin-2-ylamino)naphthalene-3,6-disulphonic acid.

Stage d)

A solution of N-methylglycine (13%, 28.75 g, equivalent to 3.73 g at 100%) and the product from Stage c) was stirred at 35° to 40° C. and at pH 7–8 for 4 hours. On cooling to 20° C. salt (20% w/v) was added with stirring, the precipitation was collected, desalinated (Visking tubing) and dried to give 23 g of title product having a λmax 546.8 nm and εmax of 34,435.

The title product was applied to cotton by printing and was found to have good build up, wash off and dyed the cotton a bright red shade.

EXAMPLE 2

Preparation of a dye of the formula

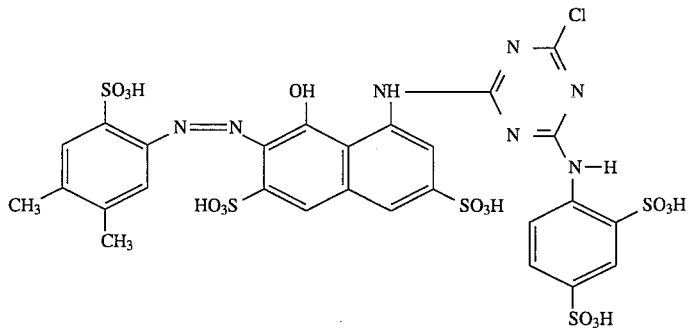

A solution of cyanuric chloride (8.53 g) in acetone (120 ml) was added to a stirred mixture of ice and water (300 g) containing a few drops of Calsolene oil, followed by an aqueous solution, at pH 6, of aniline-2,4-disulphonic acid (MI 351, 14.74 g). The mixture was stirred at 0° C. and pH 6 to 7 for 16 hours. A small amount of insoluble material was filtered off and the resultant clear solution of the dichlorotriazine was added to a solution of 1-hydroxy-2-(2-sulpho-4,5-dimethylphenylazo)-8-aminonaphthalene-3,6-disulphonic acid (MI 895, 35 g, 0.05M) in water (200 ml). The solution was stirred at 40° to 50° C. for 16 hours and pH 6 to 7 then allowed to cool to 20° C. Salt (10% w/v, 65 g) was added and the precipitated dye was collected and dried to give 22.5 g of title dye having λmax at 544.8 nm and εmax 34,740.

The title product was applied to cotton by printing and was found to have good build up, wash off and dyed the cotton a bright red shade.

EXAMPLE 3

Preparation of the dye of formula

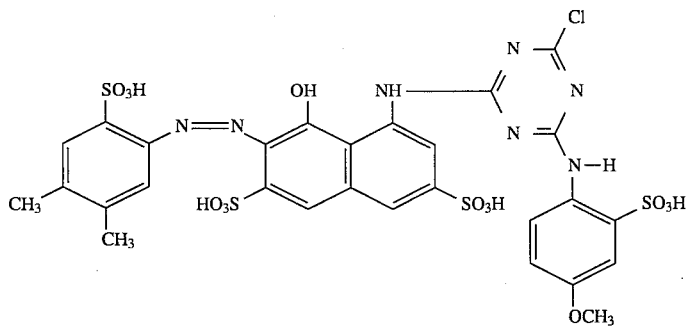

A solution of the sodium salt of 2-amino-4,5-dimethylbenzene sulphonic acid (MI 250, 22.5 g, 0.09 m) in water was added to 47.2 ml of 2N sodium nitrite solution and the resulting mixture was added dropwise to a stirred mixture of ice (200 g)/concentrated hydrochloric acid (20 ml). After stirring for 45 minutes at <5° C. the resultant diazonium salt mixture was added to a solution of 1-hydroxy-8-(4,6-dichloro-s-triazin-2-ylamino)naphthalene-3,6-disulphonic acid (0.047 m) and the mixture stirred at pH 6.5 for 45 minutes. 2-Amino-5-methoxybenzenesulphonic acid (10.61 g, 0.057M) was then added and the mixture stirred at 35° C. and pH 6.5 for 16 hours. The resultant solution was desalinated (visking tubing) and the product was isolated by removal of water at reduced pressure to give 17.4 g of title product having a λmax 545.6 nm, εmax 35,000.

The title product was applied to cotton by printing and was found to have good build up, wash off and dyed the cotton a bright red shade.

| Example | Amine | λmax (nm) |
| --- | --- | --- |
| 19 | 2-amino-5-methylbenzenesulphonic acid | 546.0 |
| 20 | 2-amino-5-chlorobenzenesulphonic acid | 545.2 |
| 21 | 2-amino-4-methylbenzenesulphonic acid | 545.6 |
| 22 | 2-carbonamidoaniline | 546.8 |

EXAMPLE 23

Preparation of the dye of the formula

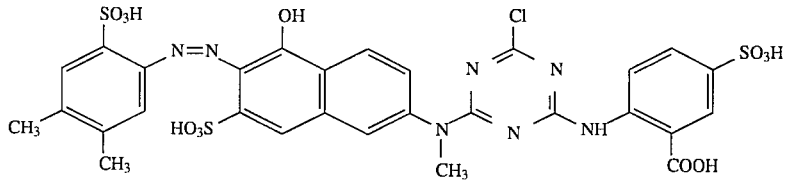

EXAMPLES 4 to 18

Further dyes were prepared using the method described in Example 1 except that in place of N-methyl glycine there was used the amine listed in the second column to give a dye having an absorbtion maximum (λmax) at the wavelength shown in the third column:

| Example | Amine | λmax (nm) |
| --- | --- | --- |
| 4 | 2-amino-5-sulphobenzoic acid | 545.0 |
| 5 | N-ethylaniline | 546.2 |
| 6 | Mixture of 3- and 4-sulpho-N-methyl aniline | 546.0 |

A solution of 1-hydroxy-2-(2-sulpho-4,5-dimethylphenylazo)-6-methylaminonaphthalene-3-sulphonic acid (25 g M.I. 690, 0.036M) in water (100 ml) was added to a mixture prepared by adding a solution of cyanuric chloride (11.3 g) and acetone (10 ml) to ice/water with stirring. The pH was maintained at 6.5 by adding 2N sodium carbonate solution. After completion of reaction (about 2 hr/<5° C.) a small amount of insoluble material was filtered off. 2-Amino-5-sulphobenzoic acid (12 g, 0.054 m) in water was added and the mixture was stirred at 40° C./pH 6.5 for 2 hours. Ethanol was added to the stirred solution to precipitate the title product (10 g) having a λmax at 495.5 nm.

EXAMPLE 24

Preparation of the dye of formula

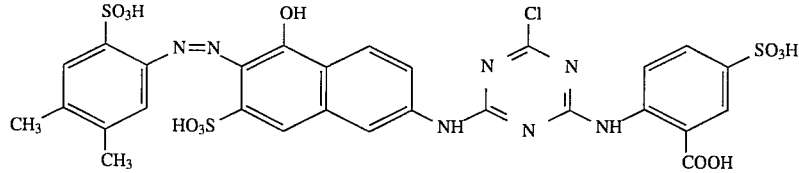

-continued

| Example | Amine | λmax (nm) |
| --- | --- | --- |
| 7 | Aniline | 546.8 |
| 8 | Ammonia | 546.4 |
| 9 | Glycine | 546.8 |
| 10 | HN(CH$_2$COOH)$_2$ | 545.2 |
| 11 | H$_2$NCH$_2$CH$_2$OCH$_2$CH$_2$OH | 546.8 |
| 12 | Metanilic acid | 545.2 |
| 13 | Sulphanilic acid | 546.8 |
| 14 | Orthanilic acid | 545 |
| 15 | Methylamine | 546.4 |
| 16 | Dimethylamine | 547.2 |
| 17 | 2-methyl-4-sulpho-N-ethylaniline | 547.2 |
| 18 | 2-methyl-5-sulpho-N-ethylaniline | 547.2 |

EXAMPLES 19 to 22

Further dyes were prepared using the method described in Example 3 except that in place of 2-amino-5-methoxybenzenesulphonic acid there was used the amine listed in the second column to give a dye having a λmax at the wavelength shown in the third column:

A solution of cyanuric chloride (6.3 g) in acetone (60 ml) was added to a stirred mixture of ice and water (250 ml) containing a few drops of calsolene oil. To the resultant slurry a solution of 1hydroxy-2-(2-sulpho-4,5-dimethylphenylazo)-6-aminonaphthalene-3-sulphonic acid (0.031 m) in water (100 ml) was added and the mixture was stirred for 2 hours at 5° C. After allowing to warm to 20° C., 2-amino-5-sulphobenzoic acid (0.06 m) was added and the mixture was heated for 2 hours at 50° C and pH 6.5. On cooling the solution was concentrated and the title product precipitated. The precipitate was desalinated (visking tubing) to give the title product (10 g) having a λmax at 496 nm.

EXAMPLES 25 to 38

Further dyes may be prepared by the method of Example 24 except that in place of 2-amino-5-sulphobenzoic there is used the compound listed below:

| Example | Compound |
|---|---|
| 25 | N-ethylaniline |
| 26 | Mixture of 3- and 4-sulpho-N-methylaniline |
| 27 | Aniline |
| 28 | Ammonia |
| 29 | Glycine |
| 30 | HN(CH$_2$COOH)$_2$ |
| 31 | H$_2$NCH$_2$CH$_2$OCH$_2$CH$_2$OH |
| 32 | Metanilic acid |
| 33 | Sulphanilic acid |
| 34 | Orthanilic acid |
| 35 | Sodium ethoxide |
| 36 | Dimethylamine |
| 37 | 2-Methyl-4-sulpho-N-ethylaniline |
| 38 | 2-Methyl-5-sulpho-N-ethylaniline |

I claim:

1. A compound of the Formula (2) and salts thereof:

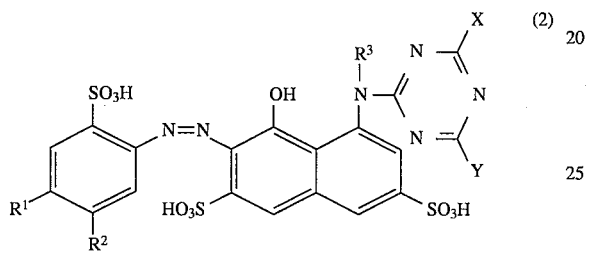

wherein:

$R^1$ and $R^2$ are each independently optionally substituted alkyl;

$R^3$ is H or optionally substituted alkyl;

X is chloro

Y is a group of formula

or —$OR^5$;

$R^4$ is H or alkyl; and $R^5$ is H or optionally substituted alkyl.

2. A compound according to claim 1 wherein $R^1$ and $R^2$ are each independently C$_{1-4}$-alkyl.

3. A compound according to claim 1 or 2 wherein $R^5$ is optionally substituted phenyl.

4. A compound according to claim 1 or 2 wherein $R^3$ is H.

5. A compound according to claim 1 wherein Y is of formula —N(R$^4$)(R$^5$) wherein $R^4$ and $R^5$ are as defined in claim 1.

6. A compound according to claim 1 wherein $R^1$ and $R^2$ are each independently C$_{1-4}$-alkyl, $R^3$ is H or C$_{1-4}$-alkyl, X is chloro and Y is a group of formula

wherein $R^4$ is H or C$_{1-4}$-alkyl and $R_5$ is optionally substituted phenyl.

7. A compound according to claim 1 of the formula:

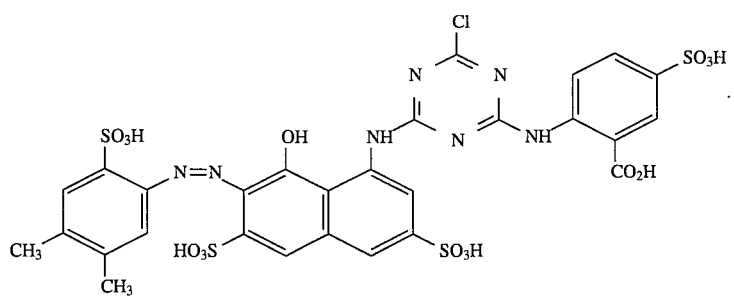

8. A process for the coloration of a textile material comprising applying thereto a compound according to claims 1 or 2.

9. A textile material colored by a dye according to claims 1 or 2.

\* \* \* \* \*